United States Patent
Moeneclaey (10) Patent No.: US 10,728,481 B2
(45) Date of Patent: Jul. 28, 2020

(54) METHOD FOR BIASING COLUMNS OF A PIXEL ARRAY AND ASSOCIATED DEVICE

(71) Applicant: STMicroelectronics (Grenoble 2) SAS, Grenoble (FR)

(72) Inventor: Nicolas Moeneclaey, Vourey (FR)

(73) Assignee: STMICROELECTRONICS (GRENOBLE 2) SAS, Grenoble (FR)

(*) Notice: Subject to any disclaimer, the term of this patent is extended or adjusted under 35 U.S.C. 154(b) by 29 days.

(21) Appl. No.: 16/165,586

(22) Filed: Oct. 19, 2018

(65) Prior Publication Data
US 2019/0238779 A1 Aug. 1, 2019

(30) Foreign Application Priority Data
Jan. 30, 2018 (FR) .................................... 18 50727

(51) Int. Cl.
*H04N 5/3745* (2011.01)
*H04N 5/378* (2011.01)
*H04N 5/357* (2011.01)

(52) U.S. Cl.
CPC ......... *H04N 5/37452* (2013.01); *H04N 5/357* (2013.01); *H04N 5/378* (2013.01)

(58) Field of Classification Search
CPC ..... H04N 5/37452; H04N 5/357; H04N 5/378
See application file for complete search history.

(56) References Cited

U.S. PATENT DOCUMENTS

2009/0090844 A1* 4/2009 Yan .................. H04N 5/3742
250/208.1
2011/0317056 A1 12/2011 Matsumoto

* cited by examiner

*Primary Examiner* — Twyler L Haskins
*Assistant Examiner* — Fayez Bhuiyan
(74) *Attorney, Agent, or Firm* — Slater Matsil, LLP (57) ABSTRACT

A method is disclosed for operating an imaging device having a matrix of pixels arranged in rows and columns. A polarization voltage is generated on a gate of a main MOS transistor that is connected as diode. The main MOS transistor is coupled between a power supply voltage and a ground circuit. Prior to reading the pixels of a row of the matrix, a plurality of first capacitors are charged with the polarization voltage. The first capacitors are coupled between the gate of the main transistor and a ground node. Upon reading the pixels of the row, the first capacitors are discharged on respective gates of auxiliary transistors coupled between the columns and the ground node so as to switch on the auxiliary transistors and deliver a substantially identical polarization current to each column.

20 Claims, 6 Drawing Sheets

METHOD FOR BIASING COLUMNS OF A PIXEL ARRAY AND ASSOCIATED DEVICE

CROSS-REFERENCE TO RELATED APPLICATIONS

This application claims priority to French Patent Application No. 1850727, filed on Jan. 30, 2018, which application is hereby incorporated herein by reference.

TECHNICAL FIELD

Embodiments of the invention relate to imaging circuits and, in particular embodiments, to a method for biasing columns of a pixel array and an associated device.

BACKGROUND

Imaging circuits conventionally comprise a matrix of pixels of which each pixel comprises a photodiode and a transfer circuit configured to transfer the charge of the pixel to a processing circuit. The processing circuit can comprise an analog-digital converter.

In the global shutter imaging circuits, the charges of the pixels can be transferred successively by row. That is all the charges of the pixels of the first row will be transferred simultaneously, then those of the second row, and so on to the last row of the matrix.

In such imagers, each column of the matrix of pixels is associated with processing circuitry, which will be successively connected to each pixel of the column in order to successively transfer the charges of all the pixels.

In order to transfer the charge of a pixel to the processing circuit, it is conventionally appropriate to polarize, by a polarization current, a pixel charge transfer circuit, in particular the follow up transistor in an architecture with three transistors (3T architecture) or with four transistors (4T architecture) well known to the person skilled in the art.

In order to transfer the charges of the pixels of a complete row of the matrix of pixels, it is accepted practice to generate a number of polarization currents equal to the number of columns of the matrix of pixels, these polarization currents having to be identical as far as possible.

Now, the transfer circuits of one and the same imaging circuit are conventionally coupled to one and the same metal track of a ground circuit.

And, it has been observed that, in the images comprising matrices of pixels having a significant number of columns, typically several thousands of columns, the generation of the polarization currents for each column can result in variations of the ground potential along the ground track, and therefore result in polarization current values which vary as a function of the position of the column in the matrix of pixels. That can cause a disturbance to the correct operation of the imaging device.

SUMMARY

Embodiments of the invention relate to imaging circuits and, in particular embodiments, to a method of the current consumption of the imaging circuits, for example, those comprising a matrix of pixels having a large number of columns.

Embodiments of the invention provide imaging circuits comprising a large number of columns, and in which all the polarization currents are stable and substantially identical.

According to one implementation and embodiment, an imaging circuit is proposed in which the two-stage operation of the polarization of the columns of the matrix of pixels makes it possible to keep the ground potential at a value that varies little enough so as not to affect the operation of the circuit.

According to one aspect, an imaging device is proposed comprising a matrix of pixels. A polarization circuit comprises a main MOS transistor configured as a diode and configured to generate a polarization voltage between the gate of the first MOS transistor and a ground circuit. Auxiliary transistors are connected between the columns of the matrix of pixels and the ground circuit. A controller is configured to, prior to a read of all the pixels of a row of the matrix, prohibit an electrical connection between the pixels of the row and the ground circuit and connect the first capacitors between the gate of the main transistor and the ground circuit so as to charge them by the polarization voltage, and to, upon the read of all the pixels of the row, respectively connect the first capacitors between the ground circuit and the gates of the auxiliary transistors so as to switch on these auxiliary transistors and delivery to each pixel of the row a substantially identical polarization current.

Thus, the first capacitors act as decoupling capacitors, which make it possible to locally follow the fluctuations of the potential of the first metal track. That advantageously makes it possible to maintain a substantially identical polarization current for all the columns of the matrix of pixels. Moreover, this current is advantageously stable.

According to one embodiment, the controller comprises a control circuit, at least one first switch and second switches, the first capacitors being coupled to the gate of the main transistor via the first switch, and the auxiliary transistors are coupled to the columns via second switches, the control circuit being configured to, prior to a read of all the pixels of a row of the matrix, close the first switch and open the second switches and to, upon the read of all the pixels of the row, open the first switch and close the second switches.

The use of switches allows for a simple production of the controller.

According to one embodiment, the controller comprise a control circuit, a first changeover switch and a second changeover switch, and the ground circuit comprises a first metal track and a second metal track that are mutually insulated, and the first capacitors are coupled between first changeover switches and second changeover switches, the control circuit being configured to, prior to a read of all the pixels of a row of the matrix, place the first changeover switches and the second changeover switches in a first position in which the first capacitors are coupled between the gate of the main transistor and the second metal track, and to, upon the read of all the pixels of the row, place the first changeover switches and the second changeover switches in a second position in which the first capacitors are coupled between the gates of the auxiliary transistors and the first metal track.

This embodiment offers an alternative to the use of conventional switches, and allows the polarization currents to circulate on a different ground lying from that used for the charging of the capacitors.

The device can comprise second capacitors coupled between third changeover switches and fourth changeover switches. The control circuit is configured to a) upon the read of all the pixels of the row, place the third changeover switches and the fourth changeover switches in a first position in which the second capacitors are coupled between the gate of the main transistor and the second metal track, and to, b) upon the read of all the pixels of the next row, place the third changeover switches and the fourth changeover switches in a second position in which the second capacitors are coupled between the gates of the main transistors and the first metal track, and to repeat the steps a) and b) for the reading of each new row by replacing the first capacitors with the second capacitors and vice versa, until all the rows of the matrix are read.

Thus, the use of two capacitors makes it possible to charge one of the capacitors while the other acts as decoupling capacitor. It is therefore possible to discharge a capacitor in order to polarize the pixels of a row and simultaneously charge the second capacitor in order to then polarize the pixels of the next rows. That allows for an increase in the speed of operation of the imager.

The matrix can have a number of columns greater than or equal to a thousand, typically of the order of several thousand, for example eight thousand columns for a matrix of eight megapixels.

According to one aspect, a system is proposed comprising a device as described previously, the system being able to be a camera or a smart mobile phone.

According to one aspect, a method is proposed for polarizing columns of a matrix of pixels of an imaging device. The method comprises a generation of a polarization voltage on the gate of a main MOS transistor mounted as diode and connected between a power supply voltage and a ground circuit. Prior to a read of all the pixels of a row of the matrix, the method includes a charging by the polarization voltage of first capacitors connected between the gate of the main transistor and the ground circuit and a non-electrical connection between the ground circuit and the pixels of the row. Upon the read of all the pixels of the row, the method discharges of the first capacitors on the respective gates of auxiliary transistors connected between the columns and the ground circuit so as to switch on these auxiliary transistors and deliver to each column a substantially identical polarization current.

According to one implementation, the method further comprises a) upon the read of all the pixels of the row, a charging by the polarization voltage of second capacitors connected between the gates of the main transistor and the ground circuit, and b) upon the read of all the pixels of the next row, discharges of the second capacitors on the respective gates of the auxiliary transistors so as to switch on these auxiliary transistors, and a charging by the polarization voltage of the first capacitors, and a repetition of the steps a) and b) for the reading of each new row by replacing the first capacitors by the second capacitors and vice versa, until all the rows of the matrix are read.

BRIEF DESCRIPTION OF THE DRAWINGS

Other advantages and features of the invention will become apparent in studying non-limiting embodiments of the invention, and the attached drawings in which.

DETAILED DESCRIPTION OF ILLUSTRATIVE EMBODIMENTS

Figure 1:
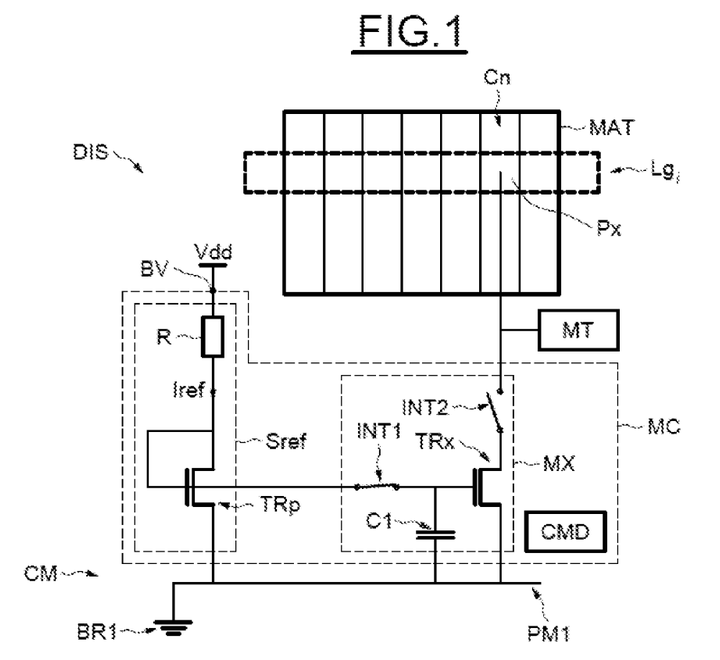
FIGS. 1 to 8 illustrate embodiments of the invention.

FIG. 1 illustrates an example of an imaging device DIS comprising a matrix of pixels MAT comprising several columns. For example, the device has a number of columns greater than a thousand, each column being coupled to processing circuitry MT configured to perform operations on signals extracted from the pixels upon the reading thereof, for example analog-digital conversion operations. A polarization circuit MC is capable of delivering a substantially identical polarization current that is advantageously stable to each column of the matrix.

Substantially identical or substantially equal should be understood to mean an equality with a 10% error margin. A stable current is understood to be a current whose intensity variations remain less than 1%.

For simplification purposes, only the elements of the invention associated with a single column of the matrix of pixels, referenced Cn, will be represented here. The features dealt with hereinbelow in the description in relation to the column Cn apply similarly to the other columns of the matrix of pixels MAT.

The structure of each pixel is conventional and known per se. The pixel can be a so-called "3T" pixel, or even a so-called "4T" pixel, comprising a follow up transistor that has to be polarized upon the reading of the pixel (read transistor switched on).

Here, the polarization circuit comprises a current mirror with switched capacitors, and is configured to deliver a polarization current that is substantially equal to a reference current Iref to each column of the matrix of pixels.

The polarization circuit MC here comprises a main active component, or reference current source Sref. In this example the reference current source Sref includes a main transistor TRp that is configured as a diode and coupled in series with a resistor R between a power supply terminal BV configured to receive a power supply voltage Vdd and a first metal track $PM_1$ coupled to a first reference terminal $BR_1$, here the ground. Here, the first metal track $PM_1$ forms a ground circuit CM.

The main transistor TRp can be passed through by a reference current Iref. The main transistor TRp therefore acts here as reference current source.

The main transistor TRp is advantageously common to all the columns of the device. The device DIS therefore comprises a single main transistor TRp.

The polarization circuit MC further comprises a plurality of auxiliary modules Mx. Each auxiliary module Mx is coupled to a column Cn of the matrix MAT. A single auxiliary module Mx is represented here.

Each auxiliary module Mx here comprises an auxiliary transistor TRx whose gate is coupled to the gate of the main transistor TRp. The auxiliary transistor TRx is capable of being passed through by a polarization current that can be equal to the reference current Iref, as will be seen hereinbelow.

Each auxiliary transistor TRx is coupled between the column Cn with which it is associated, and the first metal track $PM_1$.

Each auxiliary module Mx also comprises a first capacitor $C_1$ coupled between the gate of the auxiliary transistor TRx and the first metal track $PM_1$, and two switches $INT_1$ and $INT_2$ controlled by a control circuit CMD.

The control circuit CMD in this example is common to all the auxiliary modules Mx. The control circuit CMD and the two switches $INT_1$ and $INT_2$ form a controller of the polarization circuit.

The first switch $INT_1$ is also preferably common to all the auxiliary modules Mx.

The gate of the auxiliary transistor TRx is coupled to the gate of the main transistor TRp via the first switch $INT_1$ that can be in a closed first position or in an open second position.

The auxiliary transistor TRx is coupled to the column Cn via the second switch $INT_2$, which can be in an open first position or in a closed second position.

In the operation of the imaging device DIS, the transfer of the charges of the pixels of a row Lgi comprises a first phase, prior to the reading of the charge of all the pixels of the row, and a second phase, corresponding to the reading of all the pixels of this row Lgi.

In the first phase, the control circuit CMD switches the first switch $INT_1$ to the closed position and the second switch $INT_2$ to the open position. This is the configuration illustrated in FIG. 1.

Thus, the first capacitor $C_1$ is connected to the gate of the main transistor TRp and is charged. The column Cn is not connected electrically to the ground circuit CM and no current circulates through the auxiliary transistor TRx.

Figure 2:
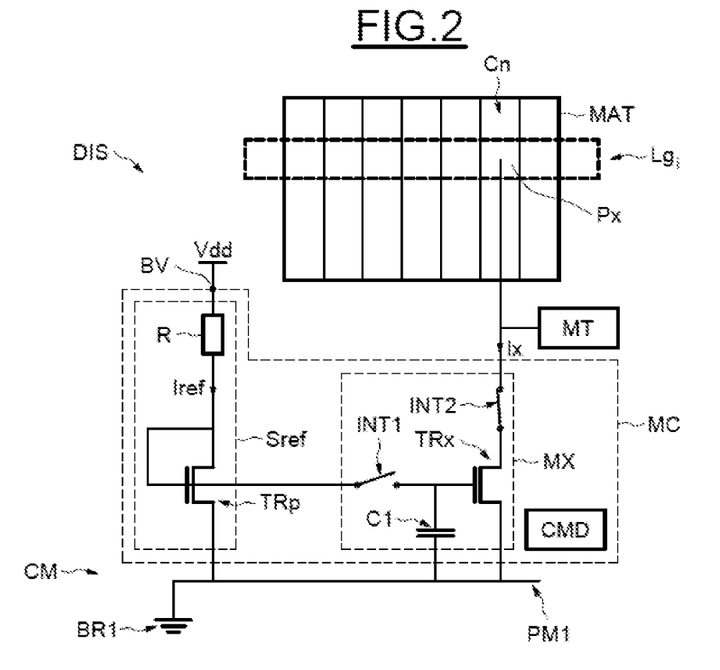

Then, in the second phase, illustrated in FIG. 2, the control circuit CMD switches the first switch $INT_1$ to an open position and the second switch $INT_2$ to a closed position.

The gate of the auxiliary transistor TRx is therefore coupled to the first capacitor $C_1$ and the auxiliary transistor TRx becomes switched on.

Thus, the polarization current Ix, substantially equal to the reference current Iref, circulates in the column Cn through the auxiliary transistor TRx to the ground.

The auxiliary modules are controlled identically and simultaneously.

In the second phase, the first capacitors $C_1$ of the auxiliary modules Mx act as decoupling capacitors, and can make it possible to locally follow the fluctuations of the ground potential.

Locally, the source potential of the auxiliary transistor TRx varies in the same way as the potential of the electrode of the capacitor coupled to the first metal track, since these two points are close.

Thus, a local variation of the potential of the first metal track will be compensated, by virtue of the first capacitor $C_1$, by an equivalent variation of the gate potential of the auxiliary transistor TRx.

This structure of the polarization circuit therefore advantageously makes it possible to ensure that all the polarization currents of the matrix MAT are stable and identical.

Figure 3:
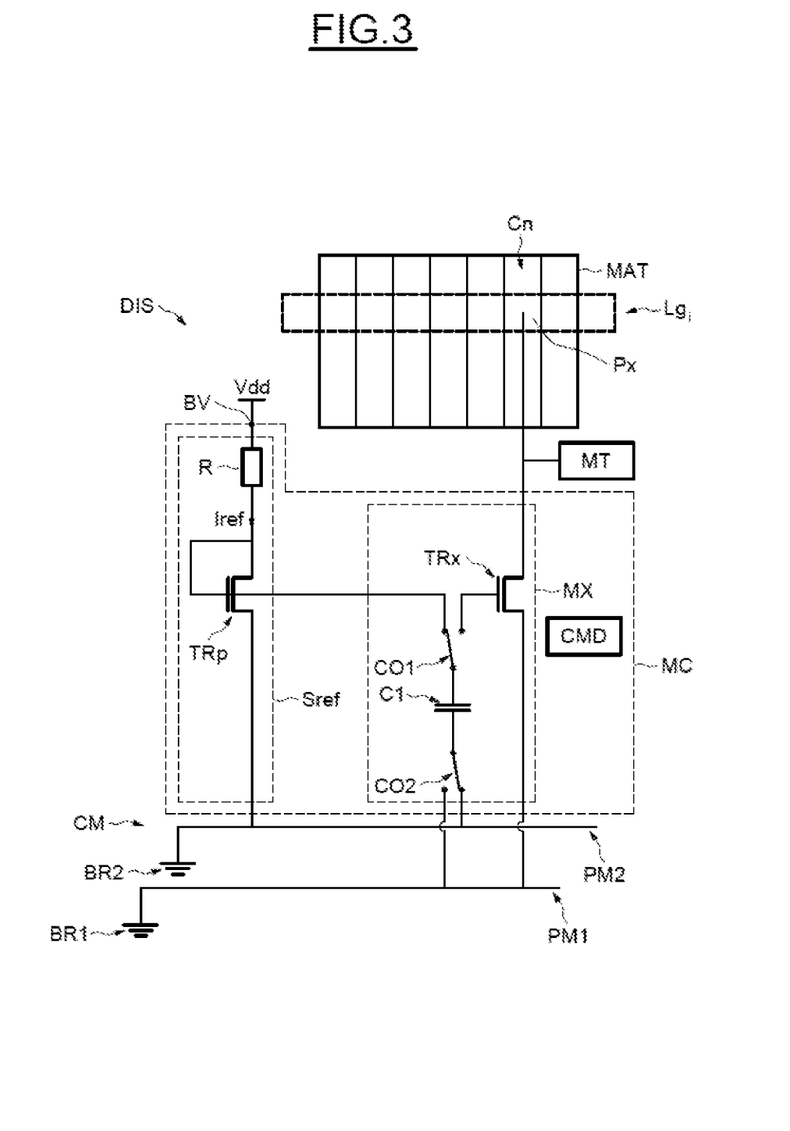

FIG. 3 illustrates an alternative embodiment, in which the switches are changeover switches, and the ground circuit CM comprises a second metal track $PM_2$, coupled to a second reference terminal $BR_2$ configured to receive a second reference voltage. Here, the second reference voltage is the ground, and the first reference terminal $BR_1$ and the second reference terminal $BR_2$ are electrically insulated from one another.

The first capacitor $C_1$ is coupled between a first changeover switch $CO_1$ and a second changeover switch $CO_2$. The first changeover switch $CO_1$ can be in a first position in which it is coupled to the gate of the main transistor TRp, or in a second position in which it is coupled to the gate of the auxiliary transistor TRx.

The second changeover switch $CO_2$ can be in a first position in which it is coupled to the second metal track $PM_2$, and in a second position in which it is coupled to the first metal track $PM_1$.

In this embodiment, as illustrated in FIG. 3, the control circuit CMD is configured to place the first changeover switch $CO_1$ and the second changeover switch $CO_2$ in their first position in the first phase. Thus, the first capacitor $C_1$ is coupled between the gate of the main transistor TRp and the first metal track, and is charged during the first phase.

The column Cn is electrically disconnected from the ground circuit CM because the auxiliary transistor TRx is switched off.

Figure 4:
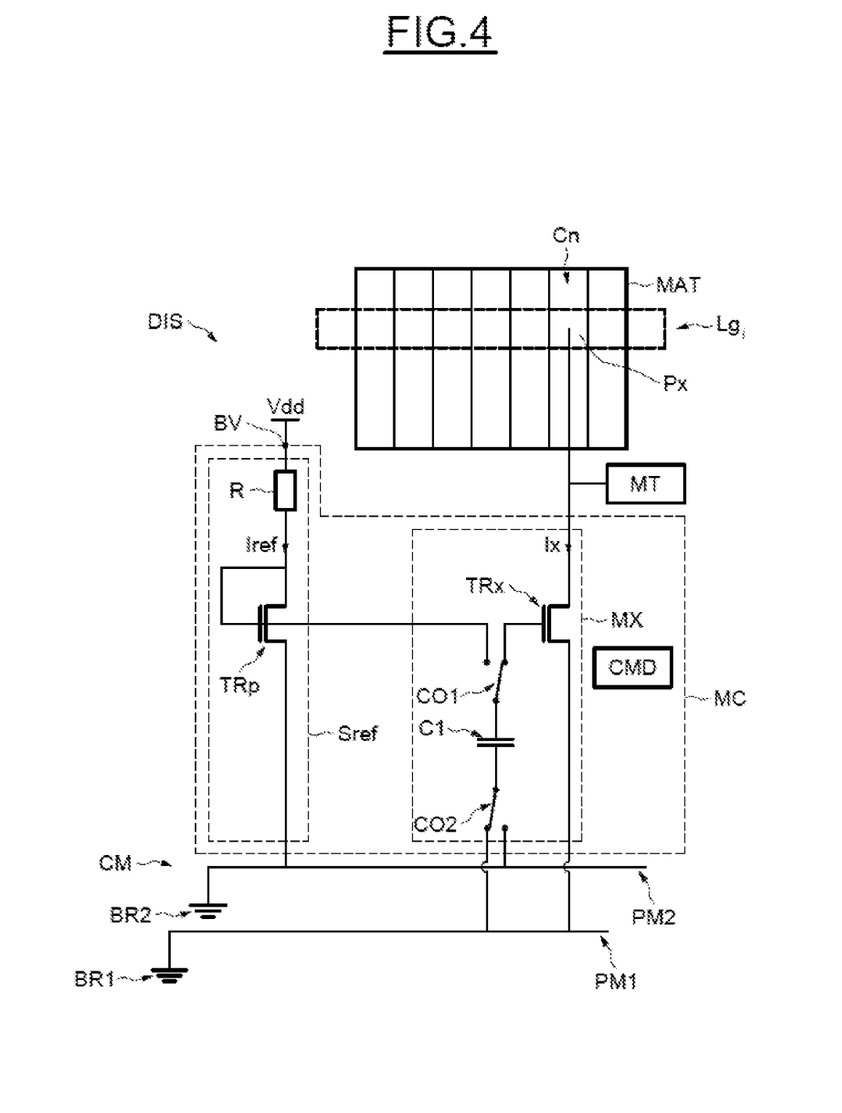

In the second phase, illustrated in FIG. 4, the control circuit CMD places the first changeover switch $CO_1$ and the second changeover switch $CO_2$ in their second position.

Thus, in the second phase, the first capacitor $C_1$ is coupled between the gate of the auxiliary transistor TRx and the first metal track $PM_1$.

The polarization current Ix of each auxiliary module then circulates through the auxiliary transistor TRx, and the first capacitor $C_1$ of each auxiliary module Mx locally compensates the fluctuations of the ground potential along the first metal track $PM_1$.

For each pixel read, the first phase and the second phase are performed in succession, in order, in the first phase, for the first capacitor $C_1$ of each auxiliary module Mx to be charged, and, in the second phase, for the polarization currents to circulate through the auxiliary transistors TRx. That can result in an additional processing time for each row of pixels.

Figure 5:
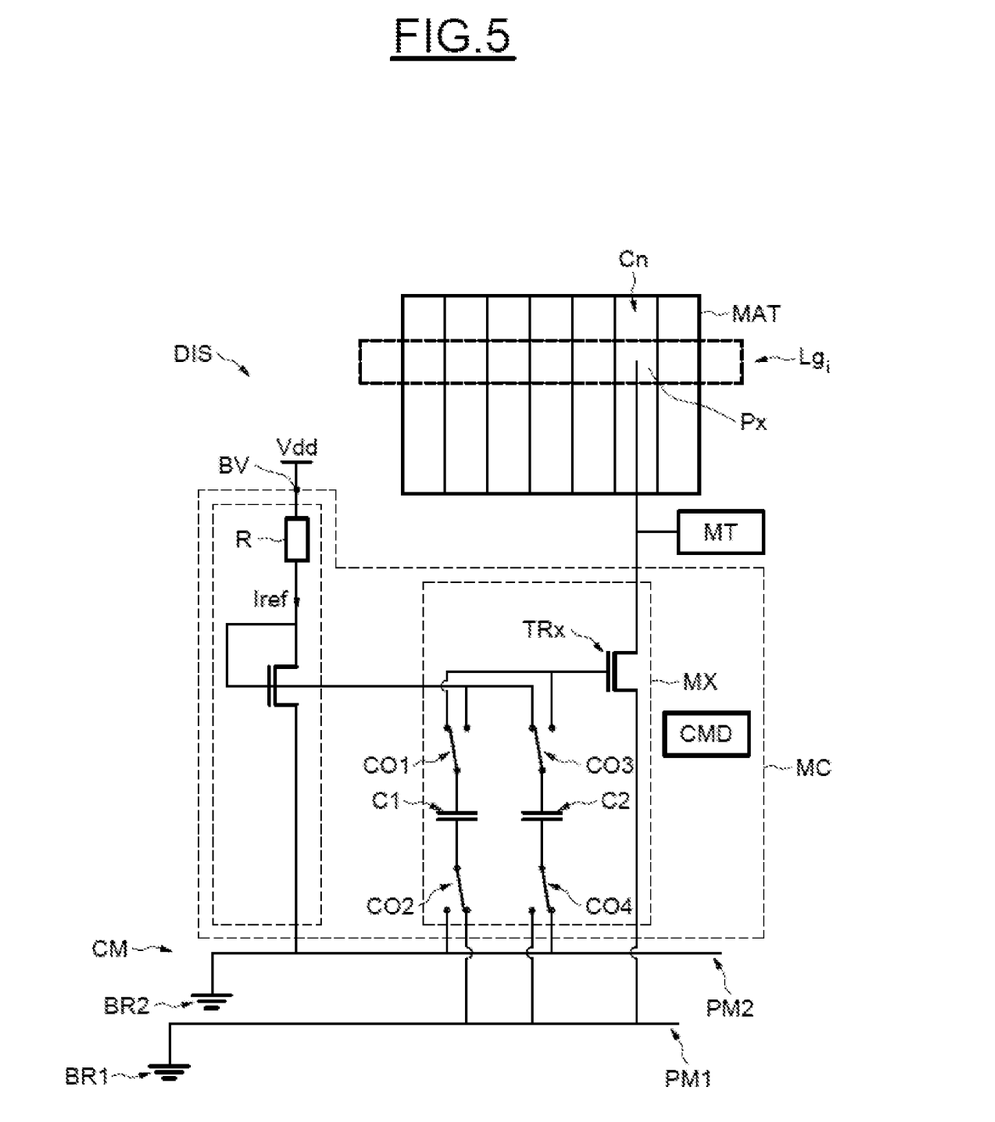
Figure 6:
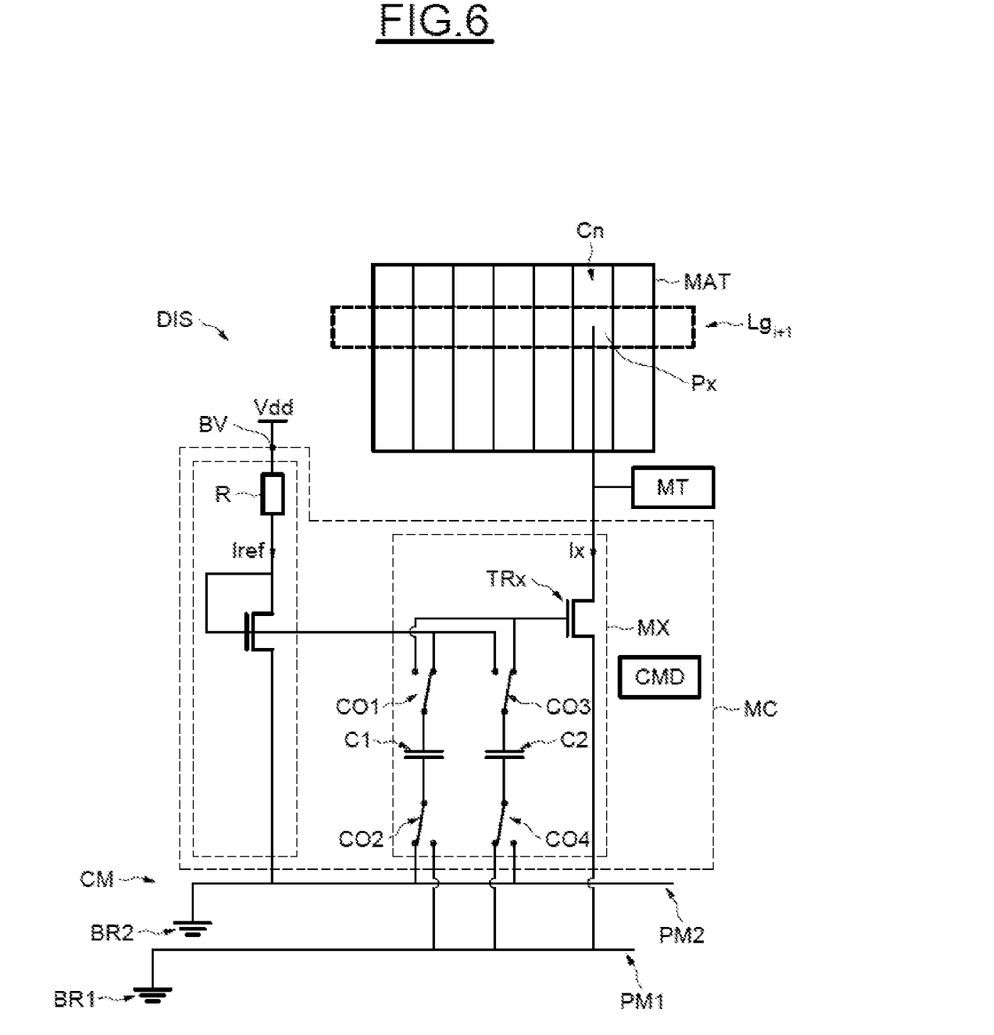

FIG. 5 illustrates an embodiment in which the auxiliary module Mx is configured to perform the second phase of the current row Lgi simultaneously with the first phase of the next row Lgi+1, that is to say of the row for which the charges of the pixels will be read directly after that of the current row.

In this embodiment, each auxiliary module Mx comprises a second capacitor $C_2$ coupled between a third changeover switch $CO_3$ and a fourth changeover switch $CO_4$.

The third changeover switch $CO_3$ can be in a first position in which it is coupled to the gate of the main transistor TRp, or in a second position in which it is coupled to the gate of the auxiliary transistor TRx.

The fourth changeover switch $CO_4$ can be in a first position in which it is coupled to the second metal track $PM_2$, and in a second position in which it is coupled to the first metal track $PM_1$.

In the reading of all the pixels of the current row Lgi, the control circuit CMD places the first changeover switch $CO_1$ and the second changeover switch $CO_2$ in their second position.

Thus, the first capacitor $C_1$ is coupled between the gate of the auxiliary transistor TRx and the first metal track $PM_1$.

The polarization current Ix of each auxiliary module then circulates through the auxiliary transistor TRx, and the first capacitor $C_1$ of each auxiliary module Mx locally compensates the fluctuations of the ground potential along the first metal track $PM_1$.

Simultaneously with the reading of the current row, the control circuit places the third changeover switch $CO_3$ and the fourth changeover switch $CO_4$ in their first position. Thus, the second capacitor $C_2$ is coupled between the gate of the main transistor TRp and the second metal track $PM_2$, and is charged.

In the reading of all the pixels of the next row Lgi+1, the control circuit CMD places the first changeover switch $CO_1$ and the second changeover switch $CO_2$ in their first position.

Thus, the first capacitor $C_1$ is coupled between the gate of the main transistor TRp and the second metal track $PM_2$, and is charged.

Simultaneously with the reading of the next row, the control circuit places the third changeover switch $CO_3$ and the fourth changeover switch $CO_4$ in their second position. Thus, the second capacitor $C_2$ is coupled between the gate of the auxiliary transistor TRx and the first metal track $PM_1$.

The polarization current Ix of each auxiliary module then circulates through the auxiliary transistor TRx, and the second capacitor $C_2$ of each auxiliary module Mx locally compensates the fluctuations of the ground potential along the first metal track $PM_1$.

The control circuit next alternates the positions of the switches in a similar way for the reading of each new row of the matrix, until all the rows of the matrix are read.

By using two transistors operating complementarily, there is no phase devoted to the charging of a capacitor (apart from the charging of the first capacitor in the processing of the first pixel of the column). In other words, the second phase associated with the reading of each row and the first phase associated with the reading of the next row are performed simultaneously. The processing time for all the pixels is therefore advantageously reduced.

The device DIS described hereinabove in association with FIGS. 1 to 6 can be incorporated in any type of system comprising images.

Figure 7:
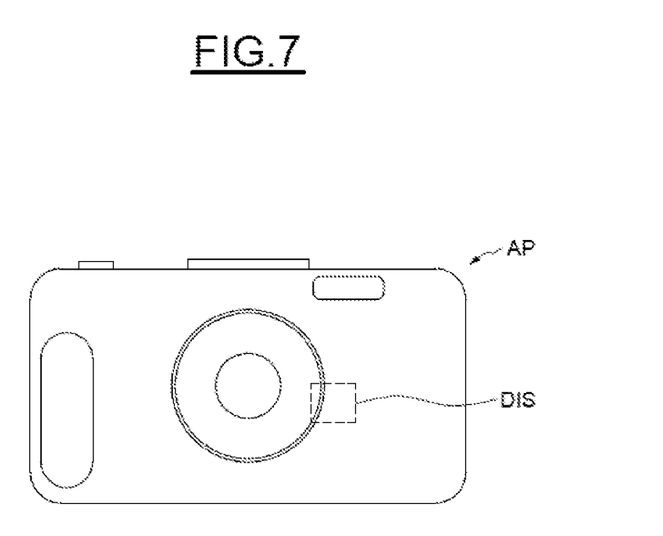
Figure 8:
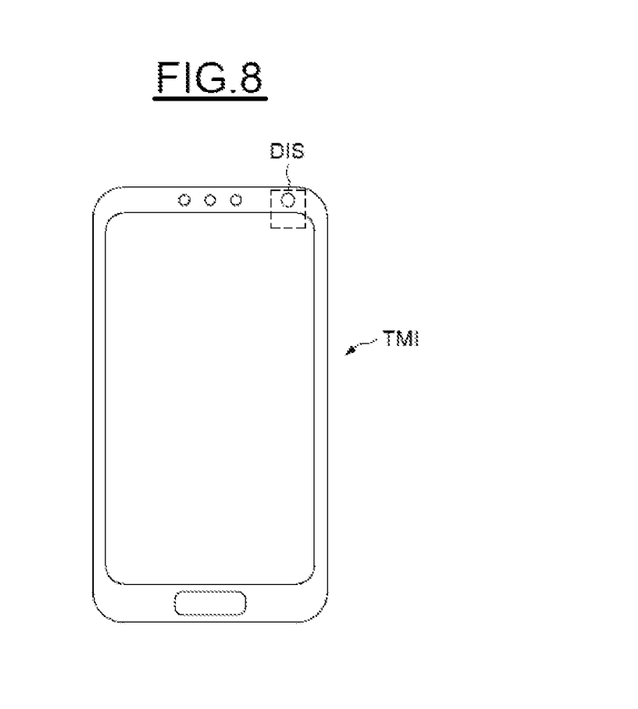

In particular, the device DIS can be incorporated in a digital camera AP such as that illustrated in FIG. 7, or in a smart mobile telephone such as that illustrated in FIG. 8.

What is claimed is:

1. An imaging device comprising:
   a matrix of pixels arranged in rows and columns;
   a main MOS transistor that is connected as a diode and is configured to generate a polarization voltage between a gate of the main transistor and a ground node;
   a plurality of first capacitors;
   a plurality of auxiliary transistors, each auxiliary transistor coupled between a respective one of the columns and the ground node; and
   a controller comprising a first switch coupled to the gate of the main transistor, each of the first capacitors being directly coupled to the first switch, the controller being configured to
   prior to a read of all the pixels of a row of the matrix, prohibit an electrical connection between the pixels of the row and the ground node and couple the first capacitors between the gate of the main transistor and the ground node using the first switch so as to charge the first capacitors by the polarization voltage, and
   upon reading of all the pixels of the row, respectively couple the first capacitors between the ground node and gates of the auxiliary transistors so as to switch on the auxiliary transistors and deliver, to each column, a substantially identical polarization current.

2. The imaging device according to claim 1, wherein the controller further comprises a plurality of second switches, each of the auxiliary transistors being coupled to a respective column of the columns through a respective second switch of the plurality of second switches.

3. The imaging device according to claim 2, wherein the controller is configured to, prior to reading all the pixels of a row of the matrix, close the first switch and open the second switches and to, upon the read of all the pixels of the row, open the first switch and close the second switches.

4. The imaging device according to claim 1, wherein the matrix has more than one thousand columns.

5. A camera comprising the imaging device according to claim 1.

6. A mobile smart phone comprising the imaging device according to claim 1.

7. A method for operating an imaging device having a matrix of pixels arranged in rows and columns, the method comprising:

generating a polarization voltage on a gate of a main MOS transistor connected as diode, the main MOS transistor coupled between a power supply voltage and a ground node;
prior to reading the pixels of a row of the matrix, charging a plurality of first capacitors with the polarization voltage using a first switch coupled to the gate of the main transistor, the first capacitors coupled between the gate of the main transistor and a ground node, wherein the each of the first capacitors is directly coupled to the first switch; and
upon reading the pixels of the row, discharging the first capacitors on respective gates of auxiliary transistors coupled between the columns and the ground node so as to switch on the auxiliary transistors and deliver a substantially identical polarization current to each column.

8. The method according to claim 7, wherein discharging the first capacitors upon the read of all the pixels of the row further comprises charging a plurality of second capacitors with the polarization voltage, the second capacitors coupled between the gate of the main transistor and the ground node; and
wherein the method further comprises, upon the read of all the pixels of a subsequent row, discharging the second capacitors on the respective gates of the auxiliary transistors so as to switch on the auxiliary transistors, and charging the first capacitors with the polarization voltage.

9. The method according to claim 8, further comprising reading all of the pixels of each further subsequent row by repeating the discharging of the first capacitors/charging of the second capacitors and discharging of the second capacitors/charging of the first capacitors.

10. The method according to claim 7, wherein each auxiliary transistor is coupled to a respective column via a second switch;
wherein charging the plurality of first capacitors prior to reading the pixels of the row comprises closing the first switch and opening the second switches; and
wherein discharging the plurality of first capacitors upon reading the pixels of the row comprises opening the first switch and closing the second switches.

11. The method according to claim 7, wherein delivering a substantially identical polarization current to each column comprises simultaneously delivering a substantially identical polarization current to over one thousand columns.

12. A method for operating an imaging device having a matrix of pixels arranged in rows and columns, each column coupled to a unique corresponding auxiliary module comprising an auxiliary transistor, a first capacitor, and a second capacitor, the method comprising
generating a polarization voltage;
prior to reading pixels of a row of the matrix, charging the first capacitor of each column with the polarization voltage, wherein, for each auxiliary module, the first capacitor and the second capacitor are coupled to a gate of the auxiliary transistor;
upon reading the pixels of the row, discharging the first capacitor of each column to deliver a polarization current to each column and charging the second capacitor of each column with the polarization voltage;
upon reading the pixels of a subsequent row, discharging the second capacitor of each column to deliver a polarization current to each column and charging the first capacitor of each column with the polarization voltage; and reading the pixels of each further subsequent row by repeating the discharging of the first capacitors/charging of the second capacitors and the discharging of the second capacitors/charging of the first capacitors.

13. The method according to claim 12, wherein generating the polarization voltage comprises generating the polarization voltage on a gate of a main MOS transistor that is connected as diode, the main MOS transistor coupled between a power supply voltage and a ground circuit;
wherein the first capacitors are coupled between the gate of the main MOS transistor and a ground node;
wherein the second capacitors are coupled between the gate of the main MOS transistor and the ground node;
wherein the imaging device includes the plurality of auxiliary transistors, each auxiliary transistor coupled between a respective one of the columns and a ground node;
wherein discharging the first capacitors comprises discharging the first capacitors on respective gates of the auxiliary transistors coupled between the columns and the ground node so as to switch on the auxiliary transistors and deliver the polarization current to each column; and
wherein discharging the second capacitors comprises discharging the second capacitors on respective gates of the auxiliary transistors coupled between the columns and the ground node so as to switch on the auxiliary transistors and deliver the polarization current to each column.

14. The method according to claim 13, wherein the ground node comprises a first metal track and a second metal track that are insulated from each other;
wherein a first terminal of each first capacitor is selectively coupled between the gate of the main transistor and the gate of the respective auxiliary transistor;
wherein a second terminal of each first capacitor is selectively coupled between the first metal track and the second metal track;
wherein a first terminal of each second capacitor is selectively coupled between the gate of the main transistor and the gate of the respective auxiliary transistor; and
wherein a second terminal of each second capacitor is selectively coupled between the first metal track and the second metal track.

15. The method according to claim 12, wherein delivering the polarization current to each column comprises simultaneously delivering a substantially identical polarization current to each column.

16. The method according to claim 12, wherein delivering the polarization current to each column comprises simultaneously delivering a substantially identical polarization current to over one thousand columns.

17. An imaging device comprising:
a matrix of pixels arranged in rows and columns;
a main MOS transistor that is connected as a diode and is configured to generate a polarization voltage between a gate of the main transistor and a ground node;
a plurality of first capacitors;
a plurality of auxiliary transistors, each auxiliary transistor coupled between a respective one of the columns and the ground node;
a controller configured to
prior to a read of all the pixels of a row of the matrix, prohibit an electrical connection between the pixels of the row and the ground node and couple the first capacitors between the gate of the main transistor and the ground node so as to charge the first capacitors by the polarization voltage, and
upon reading of all the pixels of the row, respectively couple the first capacitors between the ground node and gates of the auxiliary transistors so as to switch on the auxiliary transistors and deliver, to each column, a substantially identical polarization current;
wherein the ground node comprises a first metal track and a second metal track that are insulated from each other; and
wherein the controller comprises a first changeover switch and a second changeover switch, and wherein the first capacitors are coupled between first changeover switches and second changeover switches.

18. The imaging device according to claim 17, wherein the controller is configured to, prior to reading all the pixels of a row of the matrix, place the first changeover switches and the second changeover switches in a first position in which the first capacitors are coupled between the gate of the main transistor and the second metal track, and, upon the read of all the pixels of the row, place the first changeover switches and the second changeover switches in a second position in which the first capacitors are coupled between the gates of the auxiliary transistors and the first metal track.

19. The imaging device according to claim 18, further comprising second capacitors coupled between third changeover switches and fourth changeover switches, the controller being configured to
a) upon the read of all the pixels of the row, place the third changeover switches and the fourth changeover switches in a first position in which the second capacitors are coupled between the gate of the main transistor and the second metal track,
b) upon the read of all the pixels of the next row, place the third changeover switches and the fourth changeover switches in a second position in which the second capacitors are coupled between the gates of the auxiliary transistors and the first metal track, and
upon the read of all the pixels of the row, to repeat steps a) and b) for the reading of each new row by replacing the first capacitors with the second capacitors and vice versa, until all the rows of the matrix are read.

20. The imaging device according to claim 17, wherein the matrix has more than one thousand columns.

* * * * *